United States Patent Office 3,484,468
Patented Dec. 16, 1969

3,484,468
METHOD FOR PREPARATION OF CYCLIC ORGANOHYDROSILOXANES
James W. Curry, Dallas, Tex., assignor to Texas Instruments Incorporated, Dallas, Tex., a corporation of Delaware
No Drawing. Filed June 16, 1967, Ser. No. 646,487
Int. Cl. C07d *103/02;* C07f *7/02*
U.S. Cl. 260—448.2       5 Claims

ABSTRACT OF THE DISCLOSURE

Reacting a tertiary alcohol such as tert-butyl alcohol [$(CH_3)_3COH$] with an organohydrohalosilane such as methyldichlorosilane [$CH_3SiHCl_2$] to produce cyclic organohydrosiloxanes such as methylhydrosiloxanes

[(MeSiHO)$_n$]

having an Si—H bond.

---

This invention relates to a method for the preparation of cyclic organohydrosiloxanes, and more particularly to a method of preparing cyclic organohydrosiloxanes by reaction of a tertiary alcohol with an organohydrohalosilane.

Cyclic organohydrosiloxanes have been prepared by hydrolyzing methyldichlorosilane in ether solution. However, the yields of cyclic organosiloxanes can be poor since the Si—H bond formed during the reaction can be cleaved by the HCl formed as a by-product of the reaction. Cleavage of the Si—H bond will produce a silicone gel. The production of the gel may be illustrated by the following equation:

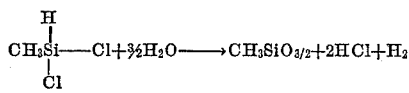

The preparation of cyclic organohydrosiloxanes by the method described above is taught by Sauer et al., Derivatives of the Methylchlorosilanes. V. Polysiloxanes from Methyldichlorosilane, J. Am. Chem. Soc., 68, 962 (1946).

Cyclic organohydrosiloxanes can be prepared by the present invention without the low temperature requirement of the prior art and without HCl cleavage of the Si—H bond.

The present invention may be generally described as a process of preparing cyclic organohydrosiloxanes by reacting a tertiary alcohol with an organohydrohalosilane.

To be more specific, reference is made to the following examples.

Example I

To a three necked separatory funnel maintained at ambient temperature and vented to the atmosphere through a condenser attached to one of the necks was added 222.4 grams (3.00 moles) of tert-butyl alcohol [$(CH_3)_3COH$] and 1 liter of benzene solvent. Through an addition funnel carried by another neck of the separatory funnel, there was added 172.6 (1.50 moles) of methyldichlorosilane ($CH_3SiHCl_2$). The methyldichlorosilane was added dropwise over a 6 hour period while the solution in the separatory funnel was stirred by a motor driven stirring rod suspended through the third neck of the separatory funnel. The solution in the separatory funnel was permitted to set for 60 hours to permit an aqueous layer to separate from the organic layer. While the solution was allowed to set for 60 hours in this instance, 12 hours or possibly less would be quite sufficient. The organic layer (1289.5 grams) was separated and placed in a distillation flask. The benzene solvent and 254.1 grams of tert-butyl chloride were removed by raising the head temperature of the flask to 79.5° C. at atmospheric pressure (743.1–747.0 mm. Hg).

The cyclic species of methylhydrosiloxane were then distilled commencing with a head temperature of 35° C. and a pressure of 25 mm. Hg and ending with a head temperature of 72° C. and a pressure of .05 mm. Hg. Table I details the results of distillation.

TABLE I

| Cyclic species or fraction | Grams recovered | As percent of total siloxane | As percent of distillable siloxane | As percent, based on MeSiHCl$_2$ used |
|---|---|---|---|---|
| (MeSiHO)$_4$ | 19.1 | 21.7 | 32.8 | 21.3 |
| (MeSiHO)$_5$ | 28.0 | 31.8 | 48.1 | 31.2 |
| (MeSiHO)$_6$ | 9.2 | 10.5 | 15.8 | 10.2 |
| (MeSiHO)$_7$ (impure) | 1.0 | 1.2 | 1.7 | 1.1 |
| Combined intermediate fractions | 0.9 | 1.0 | 1.6 | 1.0 |
| Total distillables | 58.2 | 66.2 | | |
| Residue | 29.8 | 33.8 | | 33.2 |
| Overall totals | | 100.0 | 100.0 | 98.0 |

The physical and analytical data relating to the products of distillation and the residue is detailed in Table II.

TABLE II

| Cyclic species or fraction | Molecular Weight | | Refractive index, $n_D^{25}$ | Density, $d^{25}$ | Specific refractivity, $R_D$ | |
|---|---|---|---|---|---|---|
| | Calcd. | Found | | | Calcd. | Found |
| (MeSiHO)$_4$ | 240.5 | 242.0 | 1.3850–1.3851 | 0.9852 | 0.2382 | 0.2379 |
| (MeSiHO)$_5$ | 300.7 | 304.6 | 1.3899–1.3901 | 0.9963 | 0.2382 | 0.2379 |
| (MeSiHO)$_6$ | 360.8 | 360.0 | 1.3929–1.3931 | 1.0080 | 0.2382 | 0.2370 |
| (MeSiHO)$_7$ (impure) | 420.9 | | 1.3951 | | 0.2382 | |
| Residue | | 1,752 | 1.4001 | 1.0388 | 0.2382 | 0.2334 |

In the above reaction, which may be described by the following equation:

$MeSiHCl_2 + 2(CH_3)_3COH \rightarrow$
$(MeSiHO) + 2(CH_3)_3CCl + H_2O$ a side reaction involving the tert-butyl chloride occurs to a limited extent, giving a small amount of HCl. However, due to solubility considerations, the acid is confined almost exclusively to the aqueous phase and therefore has no effect on the methylhydrosiloxanes in the organic layer. This is demonstrated by the fact that the final distillation residue, after removal of all volatile cyclics, consists of liquid only, and not solid gel.

In the above reactions, various tertiary alcohols may be used, although tert-butyl alcohol is preferred. For example, 3-methyl-3-pentanol, 2,3-dimethyl-2-butanol, 2-methyl-2-pentanol, tert-amyl alcohol, 2-methyl-3-buten-2-ol, and triphenylcarbinol may be used, as well as any of the tertiary alcohols having a lower alkyl, lower alkenyl, lower alkynyl, or aryl radicals attached to the C—OH group.

In addition to methyldichlorosilane, other organohydrodihalosilanes such as ethyldichlorosilane, phenyl dichlorosilane, vinyldichlorosilane, ethynyldichlorosilane, propargyldichlorosilane, chlorophenyldichlorosilane, alpha-naphthyldichlorosilane, and other organohydrosilanes having lower alkyl, lower alkenyl, lower alkynyl, or aryl radicals attached to the silane molecule may be used.

Further, while the reaction is preferably carried out in benzene, any suitable non-reactive solvent may be used, such as toluene, pentane, hexane or cyclohexane.

The cyclic organosiloxanes produced by the present invention may be utilized in the same manner as those produced by the prior art method of preparation. The compounds may be reacted as follows:

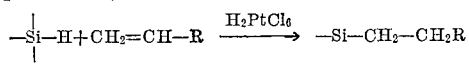

to produce silicone emulsifiers, resins, and rubbers, the type of end product depending upon the nature of R, which may be an alkyl or aryl. R may also be an alkenyl or an alkynyl, in which cases the reaction products are more complex than indicated in the above equation.

While rather specific terms have been used to describe embodiments of the invention, they are not intended, nor should they be construed as a limitation on the invention as defined by the following claims.

I claim:

1. The process of preparing cyclic organohydrosiloxanes, comprising the step of reacting a tertiary alcohol with an organohydrodihalosilane, where halo is selected from the group consisting of chlorine, bromine, and iodine, and where organo is a radical selected from the group consisting of lower alkyl, lower alkenyl, lower alkynyl, and aryl.

2. The process of claim 1, wherein said reaction is carried out in solution with an organic solvent, and said process includes the steps of:

separating said organic solvent and the product dissolved therein from the aqueous layer which develops during said reaction; and distilling the organic solvent and product dissolved therein to separate said product from said organic solvent.

3. The process of preparing cyclic organohydrosiloxanes comprising the step of reacting a tertiary alcohol having the expanded structural formula:

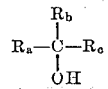

with an organohydrohalosilane having the formula

where: $R_a$, $R_b$, $R_c$ and $R_d$ are selected independently from a group consisting of a lower alkyl, a lower alkenyl, a lower alkynyl, and an aryl, and X is selected from the group consisting of chlorine, bromine and iodine.

4. The process of claim 3, wherein said tertiary alcohol is tertiary butyl alcohol and said organohydrohalosilane is methyldichlorosilane.

5. The process of claim 4, wherein said process is carried out in solution with an unreactive organic solvent, and includes the steps of:

separating said organic solvent and the product dissolved therein from the aqueous layer which develops during said reaction; and distilling the organic solvent and product dissolved therein to separate said product from said organic solvent.

No references cited.

TOBIAS E. LEVOW, Primary Examiner

P. F. SHAVER, Assistant Examiner